(12) United States Patent
Seabra

(10) Patent No.: US 10,070,692 B2
(45) Date of Patent: Sep. 11, 2018

(54) HEELED FOOTWEAR AND METHOD OF PRODUCING HEELED FOOTWEAR

(71) Applicant: ECCO SKO A/S, Bredebro (DK)

(72) Inventor: Paulo Jorge Seabra, Sao Joao Ver. (PT)

(73) Assignee: ECCO Sko A/S, Bredebro (DK)

(*) Notice: Subject to any disclaimer, the term of this patent is extended or adjusted under 35 U.S.C. 154(b) by 391 days.

(21) Appl. No.: 14/346,374

(22) PCT Filed: Sep. 19, 2012

(86) PCT No.: PCT/DK2012/050347
§ 371 (c)(1),
(2) Date: Mar. 21, 2014

(87) PCT Pub. No.: WO2013/041105
PCT Pub. Date: Mar. 28, 2013

(65) Prior Publication Data
US 2014/0237857 A1 Aug. 28, 2014

(30) Foreign Application Priority Data
Sep. 22, 2011 (DK) .................. 2011 70525

(51) Int. Cl.
*A43B 21/24* (2006.01)
*A43B 21/08* (2006.01)
(Continued)

(52) U.S. Cl.
CPC .............. *A43B 21/24* (2013.01); *A43B 13/37* (2013.01); *A43B 21/08* (2013.01); *A43B 21/20* (2013.01);
(Continued)

(58) Field of Classification Search
CPC ......... A43B 21/24; A43B 21/20; A43B 21/08; A43B 21/38; A43B 13/37; A43B 23/222
(Continued)

(56) References Cited

U.S. PATENT DOCUMENTS 1,614,989 A * 1/1927 Mulherin ............... A43B 21/24
                                                    12/147 R
2,851,797 A * 9/1958 Ronci .................... A43B 21/38
                                                    36/34 A
(Continued)

FOREIGN PATENT DOCUMENTS

EP          2143354 A1 * 1/2010 ............. A43B 13/14
FR          1121190 A       7/1956
(Continued)

OTHER PUBLICATIONS

International Preliminary Report on Patentability for corresponding application PCT/DK2012/050347 filed Sep. 19, 2012;Report dated Sep. 13, 2013.
(Continued)

*Primary Examiner* — Jila M Mohandesi
(74) *Attorney, Agent, or Firm* — Finnegan, Henderson, Farabow, Garrett & Dunner LLP

(57) ABSTRACT

A heeled footwear such as a shoe or boot includes a sole assembly and a heel part, wherein the heel part includes an insert formed in a first material. The insert includes a core body delimited by an upper surface, a lower bottom surface, and an outer surface connecting the upper and lower surfaces. At least a part of the outer surface is encased/enclosed in a second material different from the first material. The outer material forms an outer contour layer of the heel part. The sole assembly includes an outsole formed in the second material, and the second material is softer than the first material. The outsole and the outer contour layer are
(Continued)

designed to be formed in one piece providing an outer sole unit being one component.

17 Claims, 9 Drawing Sheets

(51) Int. Cl.
    *A43B 21/20*     (2006.01)
    *B29D 35/06*     (2010.01)
    *B29D 35/14*     (2010.01)
    *A43B 13/37*     (2006.01)
    *A43B 23/22*     (2006.01)
    *A43B 21/38*     (2006.01)

(52) U.S. Cl.
    CPC ............ *A43B 21/38* (2013.01); *A43B 23/222* (2013.01); *B29D 35/061* (2013.01); *B29D 35/144* (2013.01)

(58) Field of Classification Search
    USPC .......................... 36/105, 34 R, 36 R, 41, 42
    See application file for complete search history.

(56) References Cited

U.S. PATENT DOCUMENTS

| | | | | |
|---|---|---|---|---|
| 4,400,893 A | * | 8/1983 | Musci | A43B 13/34 12/142 J |
| 4,424,635 A | * | 1/1984 | Jourdan | A43B 21/24 36/34 A |
| 4,835,884 A | * | 6/1989 | Bianchini | A43B 13/28 36/108 |
| 4,928,403 A | * | 5/1990 | Nakamura | A43B 21/20 36/34 A |
| 5,829,168 A | * | 11/1998 | Fusaro | A43B 21/26 36/34 B |
| 6,519,874 B1 | | 2/2003 | Dean | |
| 6,691,432 B2 | * | 2/2004 | Masseron | A43B 13/184 36/141 |
| 6,865,825 B2 | * | 3/2005 | Bailey, Sr. | A43B 1/0054 36/29 |
| 7,266,908 B2 | * | 9/2007 | Issler | A43B 3/0047 36/28 |
| 2004/0107601 A1 | * | 6/2004 | Schmid | A43B 13/181 36/28 |
| 2006/0101670 A1 | * | 5/2006 | Bucalo | A43B 3/24 36/81 |

FOREIGN PATENT DOCUMENTS

| | | |
|---|---|---|
| FR | 1267214 A | 7/1961 |
| FR | 1270251 A | 8/1961 |
| GB | 1003951 A | 9/1965 |
| GB | 1170744 A | 11/1969 |
| NL | 6802743 A | 10/1968 |
| WO | 2009034463 A1 | 3/2009 |

OTHER PUBLICATIONS

International Search Report for corresponding application PCT/DK2012/050347 filed Sep. 19, 2012; dated Jan. 7, 2013.
Written Opinion for corresponding application PCT/DK2012/050347 filed Sep. 19, 2012; dated Jan. 7, 2013.

* cited by examiner

HEELED FOOTWEAR AND METHOD OF PRODUCING HEELED FOOTWEAR

This is a National Phase Application filed under 35 U.S.C. § 371 as a national stage of International Application No. PCT/DK2012/050347, filed Sep. 19, 2012, claiming the benefit from Denmark Patent Application No. PA 2011 70525, filed Sep. 22, 2011, the entire content of each of which is hereby incorporated by reference in its entirety.

TECHNICAL FIELD

The present invention relates to heeled footwear such as a shoe or boot comprising a sole assembly and a heel part, said heel part comprising an insert formed in a first material comprising a polymer substance, the insert comprising a core body delimited by an upper surface and a lower bottom surface placed opposite and an outer surface connecting the upper and lower surfaces, said at least a part of the outer surface being encased/enclosed in an outer material formed in a second polymer material different from the first material.

The invention also relates to a method of producing heeled footwear such as a shoe or boot, said footwear comprising a sole assembly and a heel part, said heel part comprising an insert formed in a first material comprising a polymer substance, the insert comprising a core body delimited by an upper surface, a lower bottom surface placed opposite and an outer surface connecting the upper and lower surfaces, said at least a part of the outer surface being encased/enclosed in an outer material formed in a second polymer material different from the first material.

Finally, the invention also relates to the use of a method.

BACKGROUND

WO2009/034463 discloses a high-heeled shoe comprising the high heel and a sole, and where at least a part thereof is formed in a fibre-reinforced material in order to make the shoe resistant to wear and accidental breakage during use. However, the whole sole, heel or both are formed in said reinforced material, whereby the shoe is break-resistant, but also quite unpleasant and uncomfortable to wear for a long time as there is no shock absorption. Further, the production of the shoe in question seems quite expensive as the reinforced material is used and shaped for the whole part of the heel or sole.

U.S. Pat. No. 5,829,168 discloses an insert for producing a heeled shoe comprising an insert surrounded by an outer material at least on the circumferential side and on the complete walking side. The outer material is a more elastic material compared to the material of the insert. Therefore, the elastic material placed at the walking side is exposed to wear and/or pressure during walking. At the circumferential side, the outer material is a thin layer following the contour of the insert. Therefore, it is necessary to provide different inserts in order to produce shoes that differ from each other.

EP2143354 discloses a high-heeled shoe provided with a heel having an improved resistance to, and absorption of, shocks and vibrations during use. The construction comprises an inner core placed in the heel and formed in a mixture of thermoplastic material and carbon fibre, and wrapped in a material also comprising carbon fibres. However, the inner core defines the design and construction of the shoe, and therefore it seems necessary to produce several cores having different designs in order to shape different shoes. This is quite expensive and also a very inflexible way of producing shoes. Further, the sole material seems quite hard.

DISCLOSURE OF THE INVENTION

It is an object of the present invention to obtain a new heeled footwear overcoming at least one of the disadvantages of the prior art or providing at least a useful alternative.

According to a first aspect of the invention, a heeled footwear as described in the introduction is provided, where the outer material forms an outer contour layer of the heel part, and where the sole assembly comprises an outsole formed in the second material, said second material being softer than the first material and where the outer sole and the outer contour layer are formed in one piece providing an outer sole unit being one component.

In this way, heeled footwear is achieved which is soft and pleasant to walk in and particularly resistant to wear and accidental breakage that may occur during use due to the use of the insert formed in the material harder than the outsole. The lower bottom side of the insert is not covered by the second material. Thereby, the pressure arising during walking is more directly transferred to the stiff insert, thereby optimising the stability of the heel. Further, the footwear is considerably lighter than conventional footwear due to the use of a polymer-based insert also providing a stable heel construction. Simultaneously, different designs and colours can be manufactured using the same formed insert as the visible outside of the outsole, and at least portions of the lateral sides of the heel part are formed in one piece providing the outer sole unit. Thereby, a fast, effective and resource-saving method of producing footwear is also achieved. As the heel—that is the outer lateral counter layer of the heel—and outsole are one component, further steps, such as gluing, are reduced to a minimum or not even necessary.

By "softness" is to be understood a property value of the material determined by use of a test measuring the hardness of the material. The typical Shore A value for the second material is in the range of 30-50 ShA. Depending on how soft the sole unit is to be, preferably the shore A value may be 38-46 ShA. The value for the chosen first material is higher, more than 65 Shore A, preferably more than 85 Shore A. For very high-heeled shoes, the shore A value may be even more, even exceeding a shore A value of 90 Shore A.

By heeled footwear is to be understood that in the area of the heel, the outer surface of the inside of the footwear facing the sole of the foot of the wearer is at least 2 cm vertically above the surface area of the front foot.

In this context, high-heeled shoes are defined as shoes comprising an insert with a height of more than 3-4 cm. The height of the insert is measured between the lower surface and the highest point at the upper surface axis parallel to the longitudinal axis of the insert.

In a further embodiment of the invention, the Young's modulus of the first material is larger than the Young's modulus of the second material.

Thereby, the stiffness of the insert in relation to the soft outsole is regulated.

In another embodiment of the invention, the Shore A value for the second material is in the range of 30-50 Shore A, preferably 38-46 Shore A.

This value is an advantageous value for obtaining the desired material properties in order for the footwear to be soft and pleasant when walking.

In another embodiment of the invention, the core body comprises a lower core part delimited by the lower bottom surface, an upper core part delimited by the upper surface and a middle core part connecting the upper and lower parts. Said upper core part and middle core part are encased/enclosed in the outer material forming the outer contour layer. By this construction, the part of the insert facing downwards can be covered with a material being harder than the second material.

In a further embodiment of the invention, the lower bottom surface is covered with a wear-resistant heel sole made in a third material different from the second material, or said lower bottom surface is formed in a wear-resistant material being the first material. Both the first and third materials are wear-resistant and preferably also slip resistant.

Advantageously, the surface of the heel part having contact with the ground during use of the footwear is formed in a material different from the soft second material due to the high pressure and wear taking place in this region. When this part of the heel part hits the ground, it is important that certain shock absorption takes place so that the heel sole is not easily worn down and so that the heel is stable. Preferably, the third material has a shore A value in the interval of 65-90 shore A—preferably 65-85 shore A—when the hardness of the insert is more than 90 shore A.

In another embodiment of the invention, the first material comprises a polymer matrix reinforced with glass fibres. This provides the insert with suitable stiffness.

In a further embodiment of the invention, the first material comprises a polymer reinforced with 25-45% glass fibre, preferably 30-35% glass fibre.

Young's modulus is, when using 30% glass fibres, in the area of 10 GPa and, when using 41%, in the area of 14 Gpa.

In another embodiment of the invention, the first material comprises thermoplastic polyurethane (TPU), said material having a Young's modulus of at least 8 GPa.

In a further embodiment of the invention, the second material comprises a polyurethane (PU) polymer. Preferably, the density of the polymer is in the interval of 0.4-0.6 g/cm$^3$, preferably 0.45-0.55 g/cm$^3$ and a shore A value in the range of 30-50 Shore A.

In another embodiment of the invention, in the direction parallel with a longitudinal axis of the footwear, the upper surface forms an angle of 90-45° relative to a longitudinal axis of the core body.

The angles are dependent on the height of the heel: the higher the heel, the lower the angle chosen. Preferably, the angle is in the interval 85-65°.

In a further embodiment of the invention, the upper surface comprises an opening continuing into a bore, said bore comprising a thread for receiving a threaded fastening means such as a screw or bolt. Advantageously, this is used when the insert is made for very high-heeled shoes, i.e. when the height of the insert is more than 3-4 cm. The height of the insert is measured between the lower surface and the highest point at the upper surface and axis parallel to the core body. The height of the insert is typical for very high heels in the interval of 4-8 cm. The screw/bolt is typically made in a polymer material.

In another embodiment of the invention, the core body comprises an upper core part being formed as the upper half part of an hourglass and delimited by the upper surface.

This is an advantageous embodiment for the insert for very high-heeled footwear, i.e. when the insert is more than 3-4 cm.

In a further embodiment of the invention, the sole assembly comprises the outsole, an insole and a shank.

In another embodiment of the invention, the core body comprises supporting legs, flanges and/or ribs, and the second material is arranged to surround the legs, flanges and/or ribs.

In another embodiment of the invention, the lower bottom surface is exposed or covered with a third material different from the first and second materials.

In another embodiment of the invention, the core body further comprises retention means. By said retention means, the retention of the second material to the insert is increased.

By designing the insert with ribs, the stiffness is increased and the construction as such supports the stiffness properties of the chosen material.

The invention also relates to a method as described in the introduction, said method comprising the following steps:
placing the insert in a mould
placing an upper, an insole and a shank in the mould in a predefined relation to the insert
closing the mould and injecting a second material into the closed mould, whereby the second material encases at least parts of the outer surface, and whereby an outer contour layer of the heel part and an outsole are formed as one component being an outer sole unit.

The invention also relates to use of the method for manufacturing heeled footwear as claimed.

In a further embodiment of the invention, the first material is formed in a polyamide comprising 25-45% glass fibre.

In a further embodiment of the invention, the lower bottom surface forms an angle of 90° relative to a longitudinal axis of the core body.

Thereby, an appropriate supporting surface for walking and standing is achieved.

In a further embodiment of the invention, the upper surface is concave upwards. Thereby, there is room for placing a soft material. This will act as a shock absorption means.

In a further embodiment of the invention, the core body further comprises a middle core part being formed with a uniform cross section (such as square, rectangular, circular, or oval-shaped).

In a further embodiment of the invention, the sole assembly comprises the outsole and an insole.

In a further embodiment of the invention, the insert is fastened to the shank by fastening means, i.e. a screw placed in the threaded bore in the insert.

In a further embodiment of the invention, the tensile strength at break of the first material is larger than the tensile strength at break of the second material.

In a further embodiment of the invention, the insert is a rigid part, by which the second material is supported, whereby a stiffness of the heel part is provided.

In a further embodiment of the invention, the second material is a flexible and elastic material.

In a further embodiment of the invention, the lateral sides of the sole unit exposed to the outside comprise an outer continuous surface.

In a further embodiment of the invention, the shore A value of the first material is more than 65 shore A, preferably more than 85 shore A, more preferably more than 90 Shore A.

In a further embodiment of the invention, the part of the lower bottom surface turning towards the outside comprises a layer of TPU.

The layer may be a separate layer—a heel sole—connected to, for instance by gluing, the lower surface of the insert or fastened thereto in other ways, or it may be the actual surface of the insert which is the case when the insert is formed in a hard TPU. This material combines certain rigidity with a suitable softness and is suitable for high heels having an insert lower than 4 cm.

In a further embodiment of the invention, the heel part further comprises a top part, said top part being attached to the upper core part of the insert.

Thereby, it is possible to provide this portion of the footwear being closest to the heel of the foot with properties that are even more pleasant to wear.

Advantageously, the material chosen is a softer material than the material of the insert and works as shock absorption means. The top part may be a separate unit attached to the upper surface of the insert, or it may be the second material that also flows into this area during the moulding process and covers the upper surface of the insert. The material could be a rubber, soft TPU or polyurethane.

BRIEF DESCRIPTION OF THE DRAWINGS

The invention is explained in details below with reference to the drawings in which.

DETAILED DESCRIPTION OF THE INVENTION

Figure 1A:
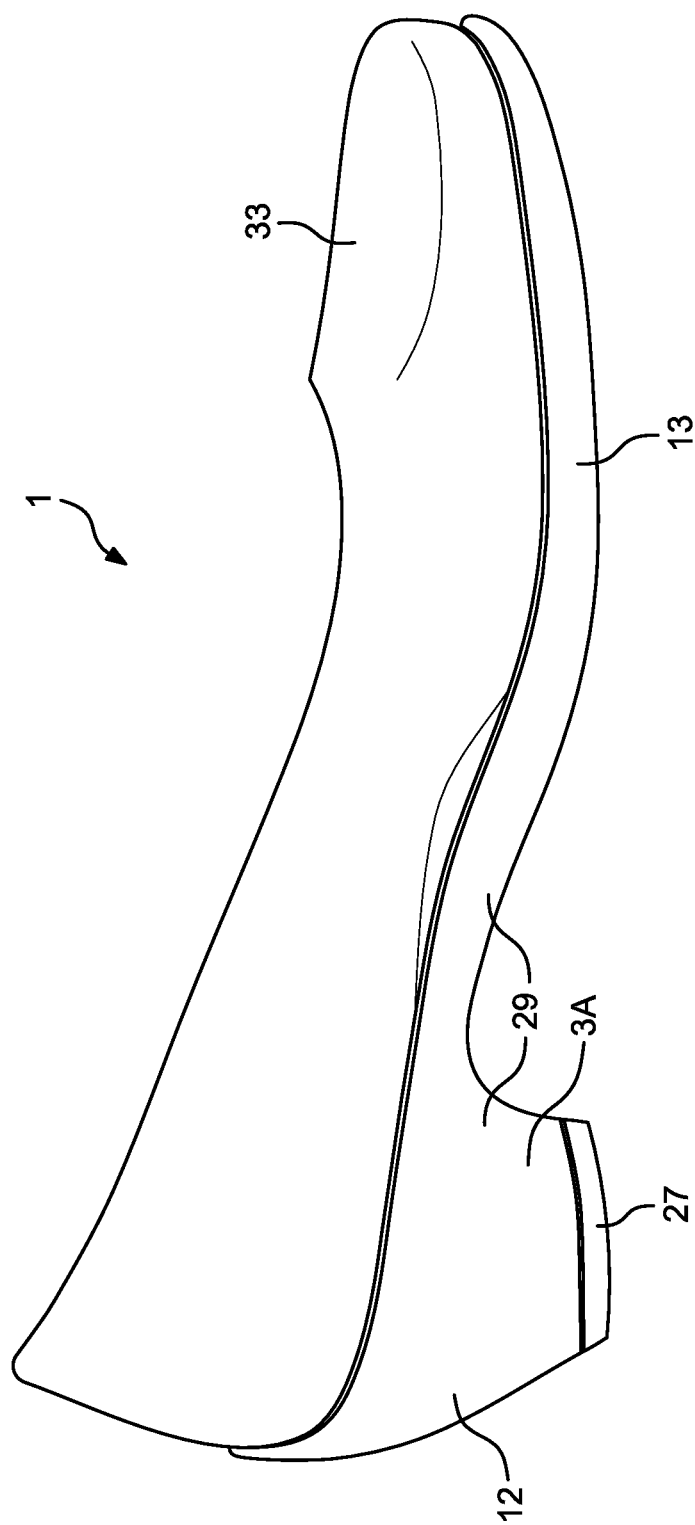
FIG. 1A shows a perspective view of a first embodiment of heeled footwear according to the invention.
Figure 1B:
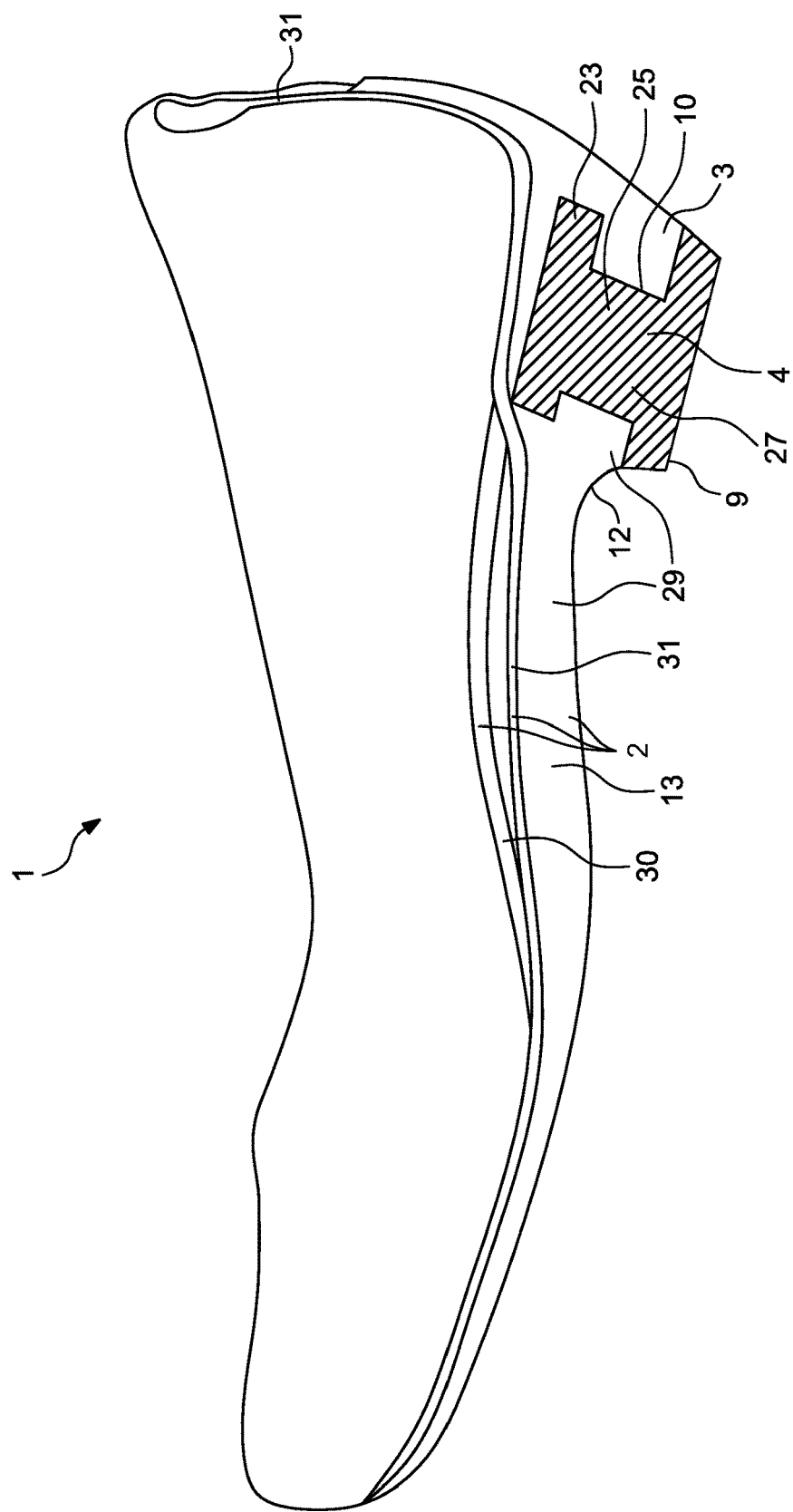
FIG. 1B shows a cross-sectional view of the heeled footwear shown in FIG. 1A.
Figure 4:
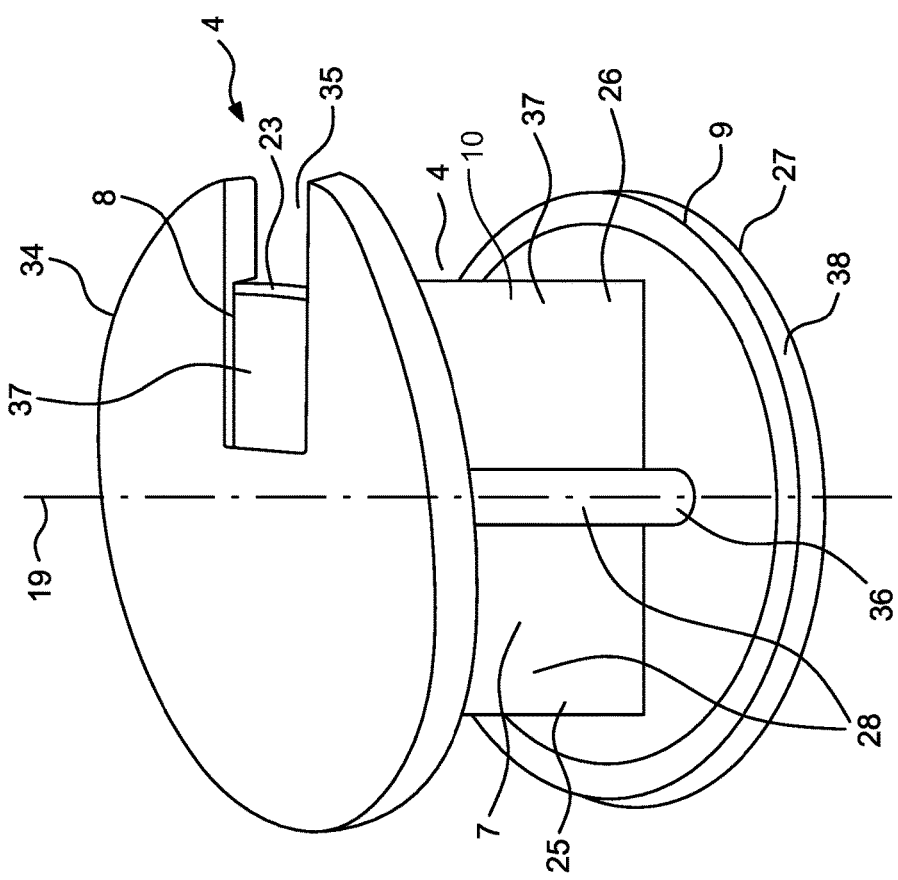
FIG. 4 shows a perspective view of a first embodiment of an insert used for the heeled footwear shown in FIGS. 1A and 1B.

FIG. 1A shows a perspective view of footwear, and FIG. 1B shows a shoe in a cross-sectional view, while FIG. 4 shows an insert 4 suitable for providing the shoe with a heel. The first embodiment will be explained with reference to said figures.

The shoe 1 comprises an upper 33 made of leather, cloth or the like and an outsole 13 of a wear-resistant material. Usually, the upper 33 of the shoe 1 is manufactured in a sewing process, and subsequently the outsole 13 is connected to the upper 33, for instance by gluing. In the present invention, the outsole 13 is glued to the upper 33 by injection moulding, i.e. by injecting a composition in a space between the upper 33 and the mould. The composition spreads out in the space and thus glues the entire outsole 13 to the upper 33 including a heel. Said vertical side of the heel is wrapped in the injected material—a second material—forming an outer layer. The outsole 13 of the heeled footwear is part of the final shoe or boot and is subjected to wear when the foot is pressing the shoe down on the ground during walking, running, climbing or similar. Typically, the outsole is made in a wear-resistant material, such as synthetic or natural rubber, or a suitable polymer, such as polyurethane. The outsole material chosen may be polyurethane with a shore A hardness in the range of 30-50 SHA. Under certain circumstances, the hardness is preferably 38-46 SHA. The heel comprises a heel part 3 comprising an insert 4 formed in a first material. The outer material surrounding the circumferential side of the insert forms an outer contour layer 12 of the heel part. The first material is chosen from materials being harder than the second material and with a larger Young's modulus than said first material. Typically, the first material is a polymer that may be reinforced with glass fibres or carbon fibres, or it may be formed in different nylon material (a suitable polyamide). A suitable material for this embodiment being a low-heeled shoe is hard TPU having a Shore A in the interval of 65-90 Shore A.

The insert 4 comprises a core body 7 formed in the first material 5 comprising a polymer substance/matrix. Further, the insert 4 comprises a core body 7 delimited by an upper surface 8, a lower bottom surface 9 placed opposite and an outer surface 10 connecting upper and lower bottom surfaces. Said at least a part of the outer surface 10 is enclosed in an outer material formed in a second material different from the first material. The core body 7 comprises a lower core part 26 delimited by the lower bottom surface 9, an upper core part 23 delimited by the upper surface 8, and a middle core part 25 connecting the upper 23 and lower 26 parts. Said upper core part 8 and middle core part 25 are encased/enclosed in the outer material forming the outer contour layer. The outsole 13 and the outer contour layer 12 of the heel part 3 are one unit, i.e. one component forming an outer sole unit 29.

The lower bottom surface 9 limiting the lower core part 26 comprises a heel sole 27 as an integrated part, or the heel sole 27 may be attached. Typically, said heel sole 27 is formed in a material with a higher wear-resistance than the second material. In the embodiment shown in FIG. 4, the heel sole 27 is an integrated part of the insert 4 and formed in the same step as the insert 4 and in the same material, i.e. hard TPU.

Figure 5A:
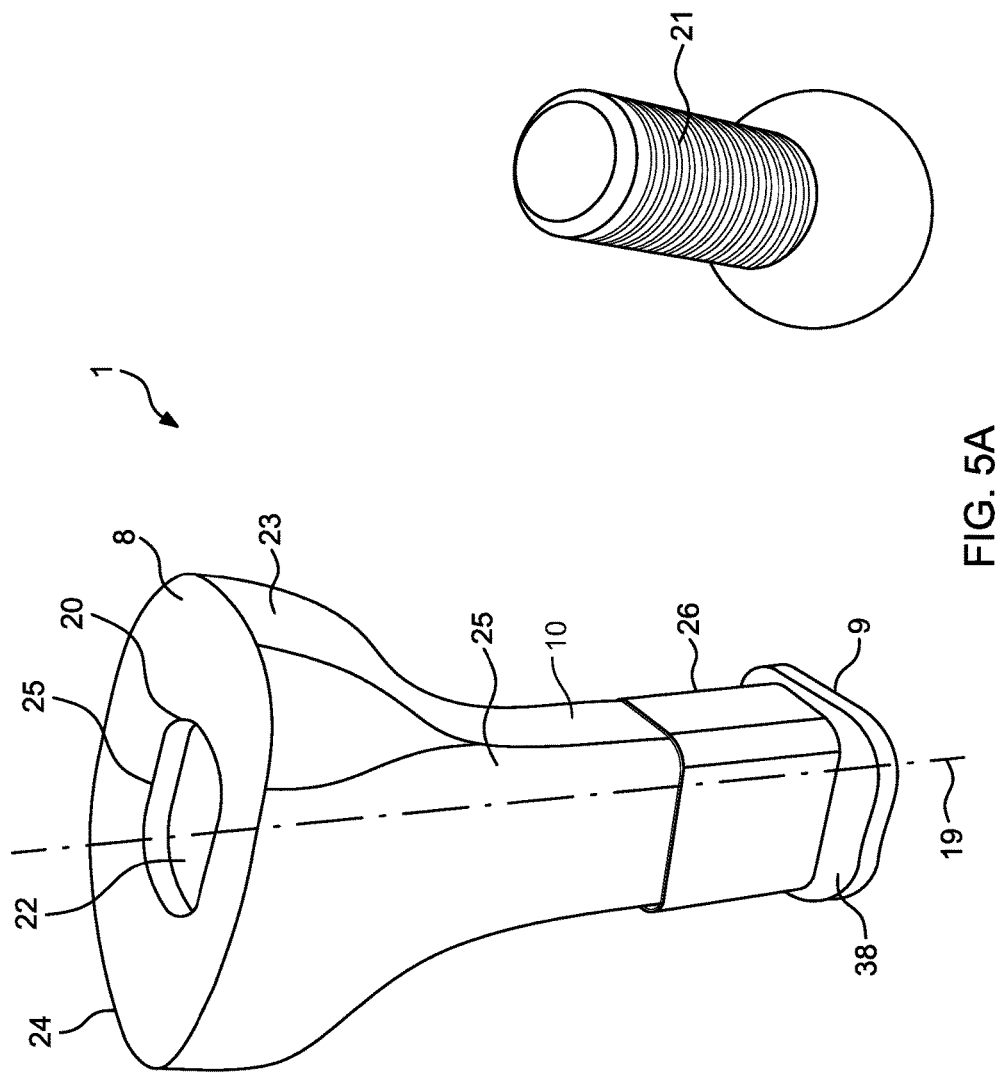
FIG. 5A shows a perspective view of a second embodiment of an insert used for the heeled footwear shown in FIGS. 2A, 2B, and FIG. 3.
Figure 5B:
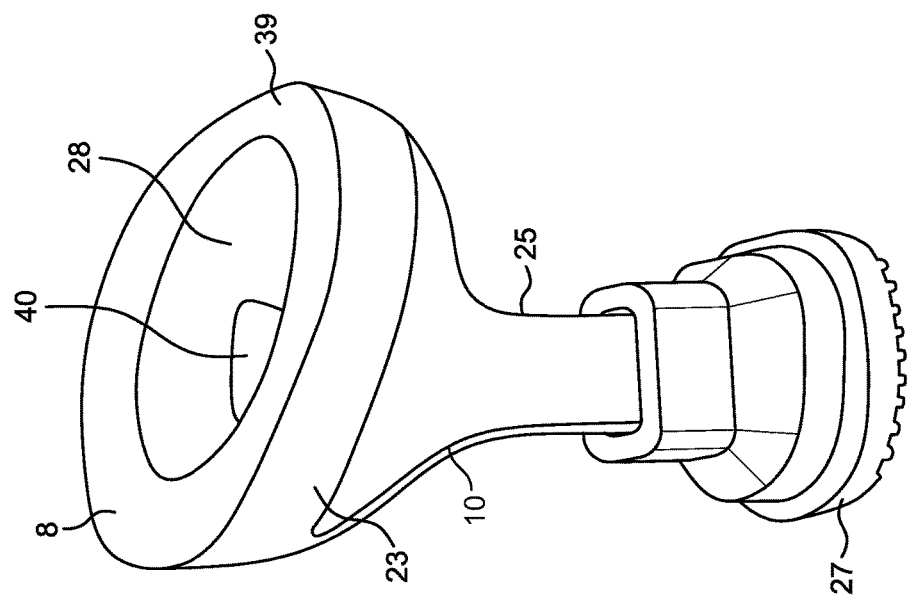
FIG. 5B shows a perspective view of a third embodiment of an insert used for the heeled footwear shown in FIGS. 2A, 2B, and FIG. 3.

The heel sole 27 is circular, but may be made in any design, i.e. square, rectangular etc., being 5-6 mm thick. The heel sole 27 may also be manufactured as a separate unit and glued to the lower bottom surface 9. (This is shown in FIGS. 5A and 5B.) A top part 34 is placed opposite the heel sole 27. Said top part 34 is made in a soft material, for instance soft TPU. The top part 34 is circular with a rectangular opening. The top part 34 is glued to the upper surface 8 and angled 90-60°, preferably 87-80°, compared to the longitudinal axis 19 of the core body 7. Typically, this is a value in a design using this sort of insert embodiment, i.e. for heeled shoes not being high-heeled shoes. See below for definitions of high-heeled shoes and heeled shoes in general.

The core body 7 in FIG. 4 comprises supporting legs, ribs and plates 28. The irregular form of the outer surface of the insert works as retention means increasing the adherence between the insert and the second material in which the insert is embedded. In this embodiment, the core body 7 comprises one main plate 36 placed along the diameter of the lower surface 9 perpendicular to the lower surface and two further plates 37 placed perpendicularly to the main plate 36. In this way, a rigid construction is obtained supporting the function of the rigid material chosen for the insert 4. At the lateral side of the middle core part 25 and the upper core part 23, the insert 4 is covered with the second material. The material may have any colour, and the outer contour layer 12 may have any desired design such as circular, rectangular, square, and also with different designs at different square sections. The outer contour layer 12 and the outsole 13 form the outer sole unit 29. Typically, the insert 4 is fastened to a shank 30. Said fastening takes place during the manufacturing process as the injected material covers the shank 30 and parts of the insert 4, whereby the two elements are positioned and fastened in relation to each other. A fastening means such as a screw or a bolt may be used after the moulding process in order to strengthen the connection between the two elements. An insole 31 is placed between the shank 30 and the outsole 13. Said outsole 13, shank 30 and insole 31 comprise a sole assembly 2. Typically, the insert described is formed in hard TPU suitable for heeled footwear having an insert being lower than around 4 cm.

Figure 2A:
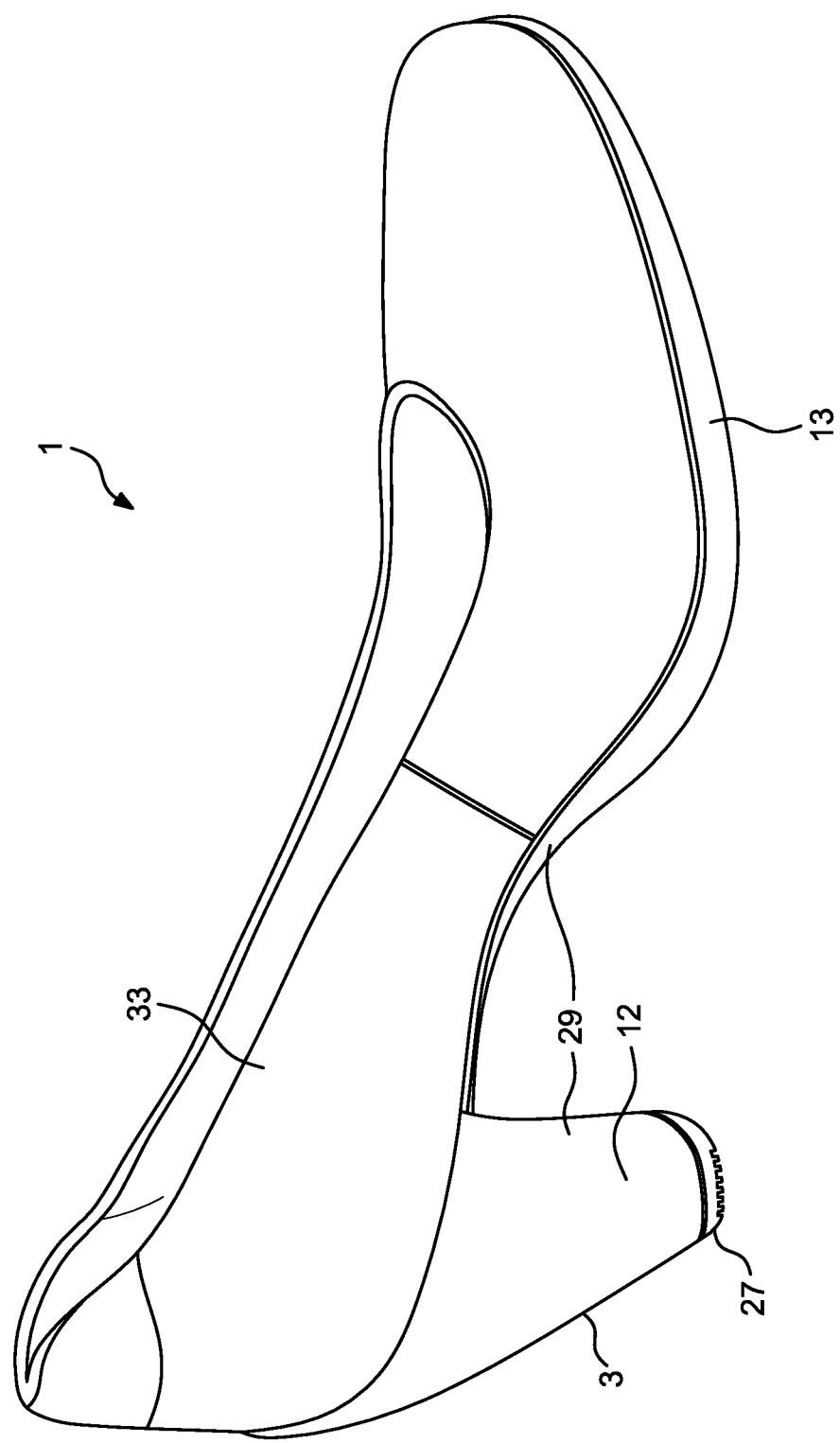
FIG. 2A shows a perspective view of a second embodiment of heeled footwear according to the invention.
Figure 2B:
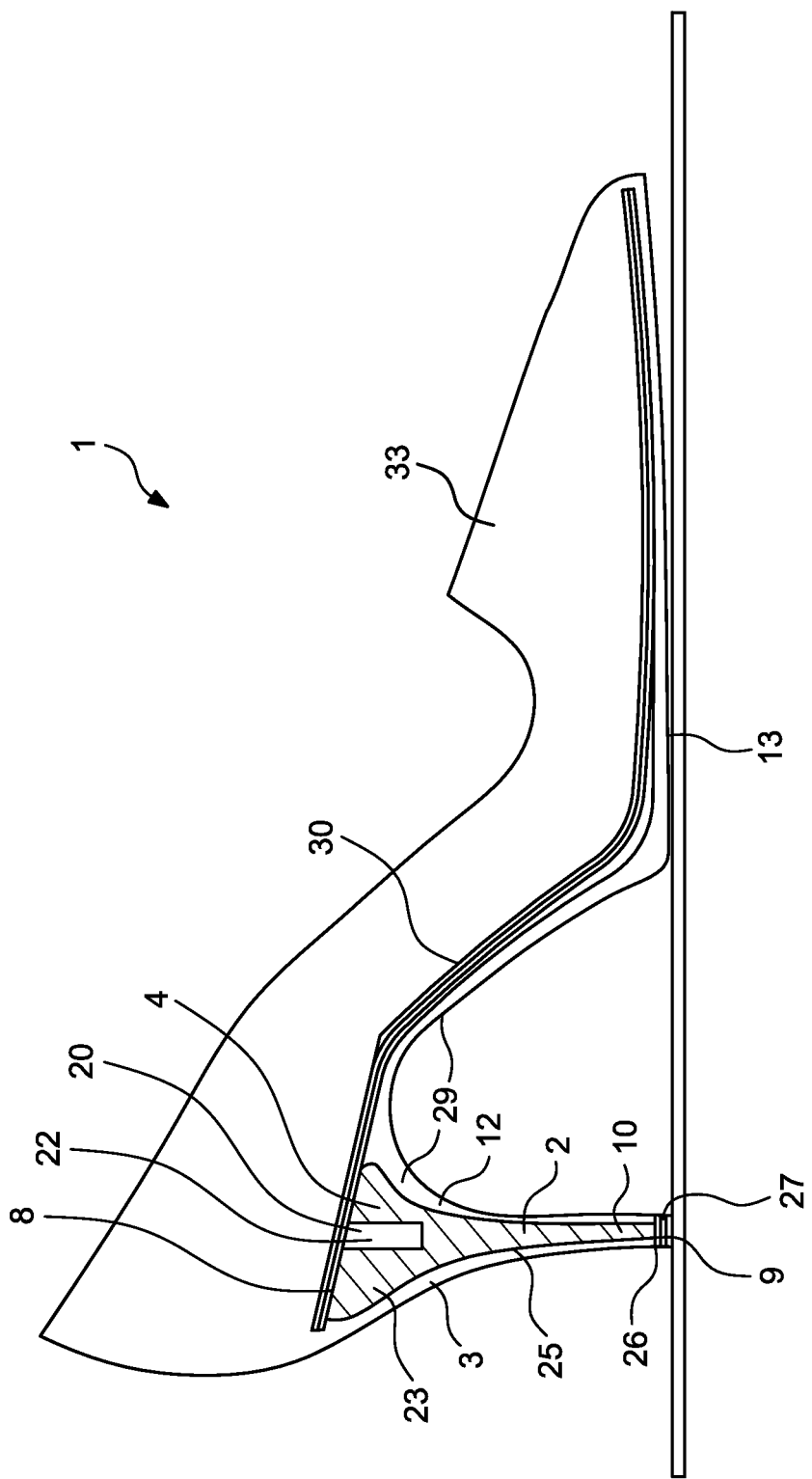
FIG. 2B shows a cross-sectional view of the heeled footwear shown in FIG. 2A.

FIGS. 2A and 2B show a high-heeled shoe 1 being defined as a shoe comprising an insert 4 with a height of more than 3-4 cm. The height of the insert 4 is measured between the lower surface and the highest point at the upper surface and axis parallel to the core body 7. Typically, the insert 4 is for very high heels in the interval of 4-8 cm. In general, heeled shoes are defined as shoes, where the vertical distance between the lowest placed point at the forefoot and the lowest placed point at the heel region is at least 2 cm. The points placed at the surface turn towards the foot.

FIGS. 5A and 5B are examples of inserts 4 suitable for the high-heeled shoe 1. The reference signs in FIGS. 5A and B are the same as in FIGS. 1A and B and in principle, the high-heeled shoe is formed in the same way as the heeled shoe in FIGS. 1A and B. Principally, the only difference between the shoes 1 is the design of the insert and the material chosen for the insert 4, i.e. the construction of the inserts and the material chosen. Advantageously, the material is a material having a higher Young's modulus than the material used for the low-heeled shoes such as the one shown in FIGS. 1A and 1B.

Examples First Material
Technyl® A 218 V30 Black 21NS
Copolyamid and 30% glass fibre
Mechanical properties: Tensile modulus/Young's Modulus: 10 GPa (ISO 527 type 1 A)
Tensile strength at break: 190 MPa
Elongation at break: 3%
Rhodia Technyl® A 218 V43 43% glass filling, heat-stabilised nylon 66 comprising polyamide and 43% glass fibre
Tensile modulus/Young's Modulus: 13.8 GPa
Elongation at break: 2%
Tensile strength at break: 230 MPa.

The principle of a high-heeled shoe and insert suitable therefore will be explained with reference to FIGS. 2A, B and FIGS. 5A, B and FIG. 6.

The shoe 1 comprises an upper 33 formed in leather, and a heel part 3 and an outsole 13 are attached thereto. The heel part 3 comprises an insert 4. Said insert 4 is attached to the shank 30 by retention means such as a bolt 21. Said bolt 21 is placed in a circular opening 20 in the upper surface 8 and continues in a threaded bore 22 placed in the upper core part 23. The insert 4 is wrapped in the second material as explained above. By this arrangement, the outer contour layer 12 is formed. The lower surface 9 of the insert 4 is covered with a heel sole 27 made in a third material, such as hard TPU. Said TPU is wear and slip-resistant having an A Shore of 85-90 A shore. Advantageously, the heel sole 27 is fastened to the lower bottom surface 9 by gluing due to the chosen material for the insert, for instance a polymer being reinforced with glass fibres. The insert 4 is formed conically like the upper part of an hour glass. In this way, the upper surface 8 of the insert 4 has an adequate area for supporting the heel of a foot, and the lower surface 9 has a small cross section area suitable for providing an outer contour of the heel being conical and having a more slim and delicate design. However, the insert 4 may have the same cross section area all the way through depending on the weight that the shoe should be able to withstand. The second material surrounding the lateral side of at least the upper 23 and middle core part 25, and possibly also parts of the lateral sides of the lower core part 26, forms an external surface being independent of the insert geometry. The insert 4 must just be covered in such a way that it is not visible from the outside as the second material forms the contour of the heel. The insert 4 in FIG. 5A may be manufactured in one piece or it may be manufactured in several pieces and afterwards connected to each other by press fitting and/or gluing. As mentioned above, the upper core part 23 is conically formed and delimited by the upper surface 8 provided with a circular opening 20 leading into the threaded bore 22 for receiving a fastening means such as a screw or a bolt 21. The upper surface 8 is concave upwards 24 similar to the outer surface of the sole of a foot heel. The upper surface 8 is angled in relation to the central longitudinal axis 19 of the insert; the angle being in the interval of 90-45°; for a high-heeled shoe as described, preferably in the interval 85-65°. The middle core part 25 and the lower core part 26 are rectangular in the cross section, with the cross section area being substantially uniform all the way through. The lower bottom surface 9 comprises a radial flange 38 being 1-2 mm thick and protruding in relation to the lower core part 26. A heel sole is attached to the lower bottom surface 9 and may continue in such a way that it covers a piece of the lateral outer sides of the lower core part 26. As explained above, the rest of the lateral sides of the lower core part 26 are covered with the outer contour layer 12.

Figure 3:
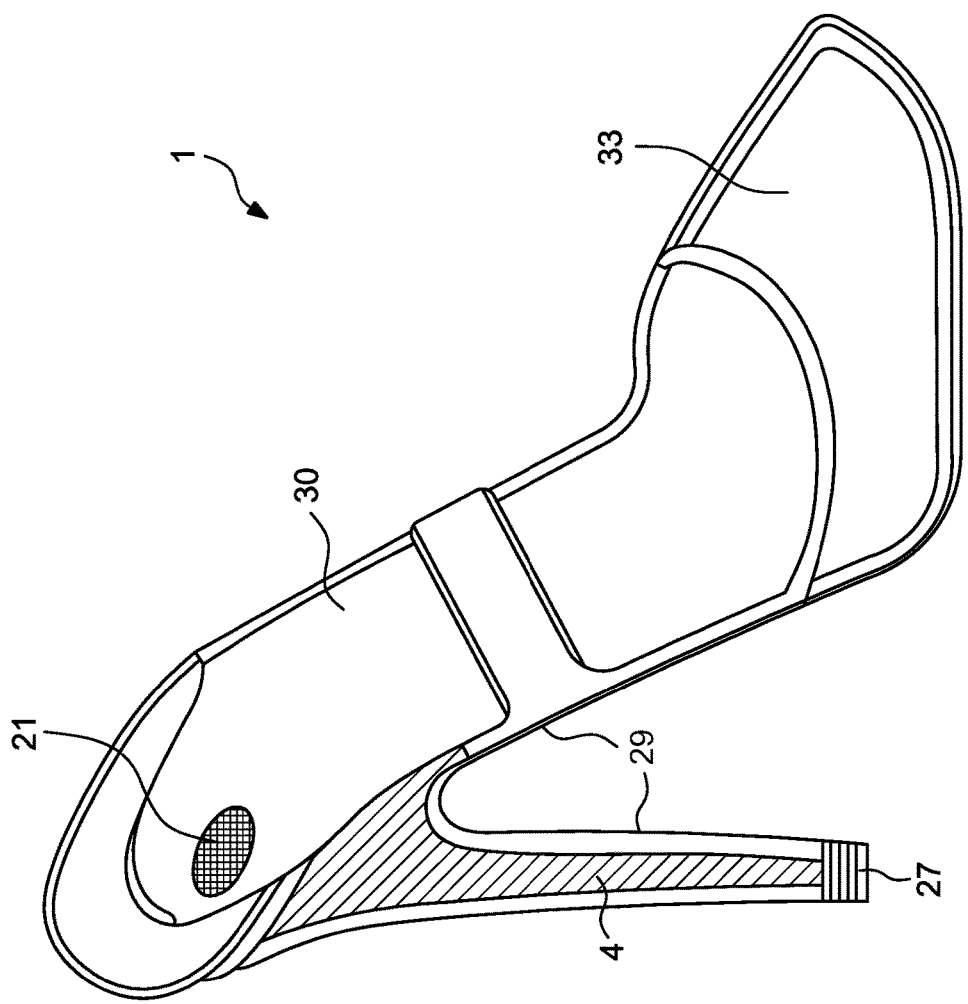
FIG. 3 shows a perspective and cross-sectional view of a third embodiment of heeled footwear according to the invention.

FIG. 5B shows a third embodiment of an insert 4 suitable for the high-heeled shoe 1 shown in FIGS. 2A and 2B and FIG. 3. The reference signs are equivalent to the reference signs used in FIG. 5A. Principally, the difference between the embodiment in FIG. 5B and the embodiment in FIG. 5A is the design of the upper core part 23. The upper surface 8 has the same principal slant, but the circumferences are around 25% larger and formed as a rim 39 with a cavity 40. The rim 39 is connected to the middle core part 25 by three separate connections/legs 28 converging towards the middle core part 25. The joining of the supporting legs forms the bottom of the cavity, and between the supporting legs 28 small cavities are formed so that upon injection, the outsole material may flow into these cavities and increase the adherence between the insert 4 and the second material/the outer contour layer 12. The cavities and the supporting legs 28 work as retention means increasing the adherence between the insert and the second material. Other fastening means such as screws may be screwed into openings/holes in the upper surface 8. The heel sole 27 is glued to the lower bottom surface.

Figure 6:
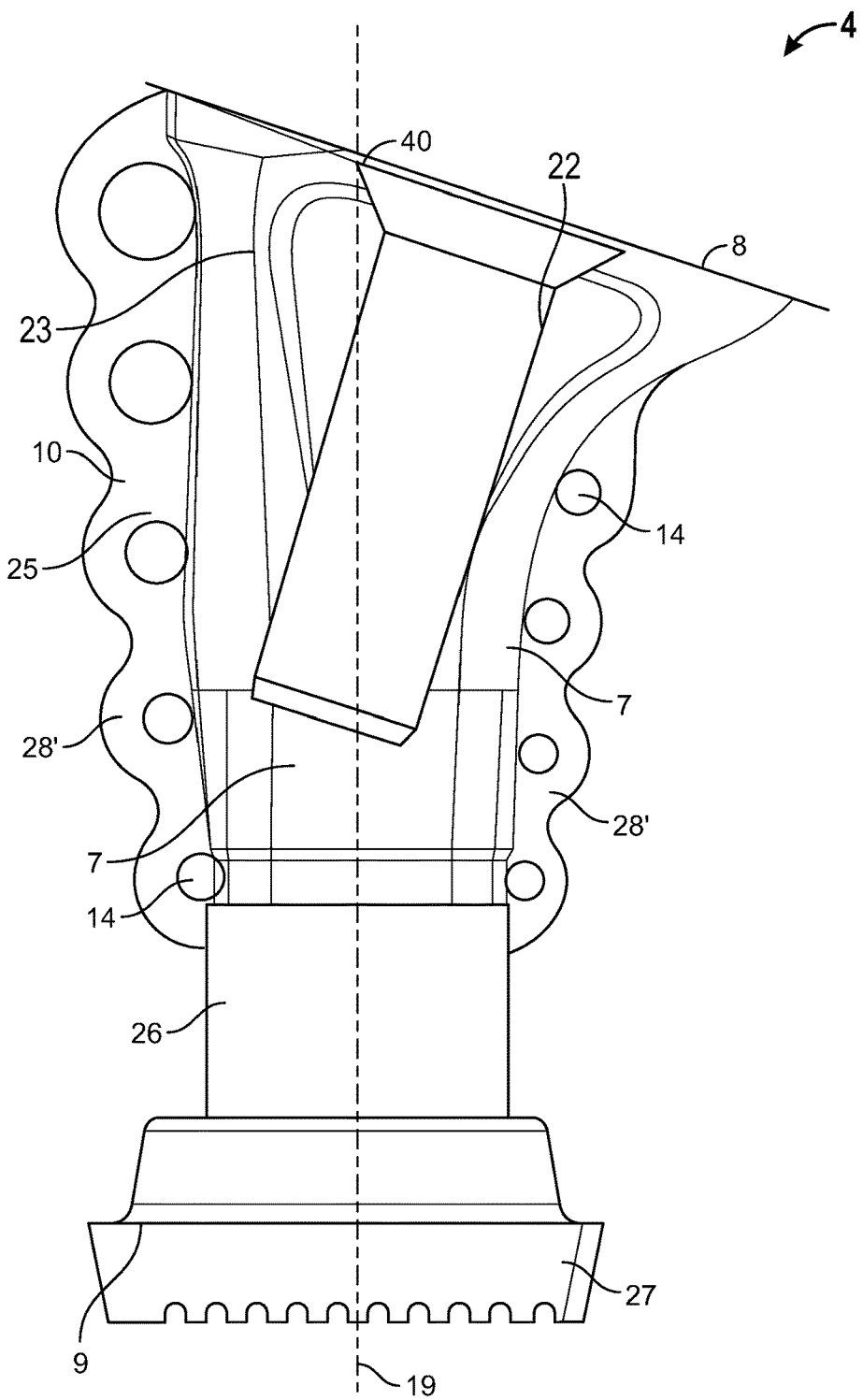
FIG. 6 shows a cross-sectional view of a fourth embodiment of an insert used for heeled footwear shown in FIGS. 2A, 2B and FIG. 3.

FIG. 6 is a fourth embodiment of an insert. The reference numbers used in FIGS. 5A and 5B also apply to this embodiment. Principally, the difference between this embodiment and the embodiments shown in FIGS. 5A and 5B is the construction of flanges 28' being a part of the insert. The flanges help the second material to adhere to the insert 4 in a safe manner. The insert is constructed with two flanges 28', i.e. one flange pointing towards the tip of the shoe and one flange pointing in the opposite direction. The flanges 28' are provided with bores 14 in order to increase the adherence between the insert 4 and the surrounding second material. Flanges and bores work as retention means. During production of the shoe, the second material flows through the bores 14 during the injection of the second material. Each flange 28' is provided with 4-5 bores, but it may be more or less depending on the dimensions of the flange in question. The diameter of the bores is increased in the direction from the lower bottom surface 9 towards to upper surface 8. The diameter is between 1 mm and 4 mm. The diameter of the bores placed in the flange turning away from the tip of the shoe is larger than the bores placed in the opposite flange. This is due to the thickness of the second material surrounding the insert being larger at the backside of the heel compared to the front side of the heel.

FIG. 3 shows a third embodiment of heeled footwear according to the invention and shows an extremely high-heeled sandal. In this case, an insert 4 as shown in FIGS. 5A and 5B is suitable for reinforcing the heel part. Advantageously, the material used is glass fibre or carbon fibre reinforced polymer.

The footwear according to the invention is manufactured in the following way which applies to all the embodiments:

The insert 4 is placed in a mould. The insert 4 is manufactured in a separate process before being placed in the mould. Afterwards, a last with the upper 33 (said upper is also manufactured in a separate process and when suitable, also with an insole and a shank positioned in relation to the last) is placed in the mould and positioned in relation to the insert, i.e. the heel area of the upper is placed in the same area as the insert. Afterwards, the mould is closed, and a material is injected into the closed mould. By this step, an outer contour layer 12 of the heel part 3 and the outsole 13 is formed as one component creating an outer sole unit 29. When the material is sufficiently cooled, the mould is opened, and the shoe is taken out. Depending on whether the shoe is a high-heeled shoe or a heeled shoe in general, there may be a further process. If the shoe is a heeled shoe, the insert 4 will typically be made in a TPU. In this case, the heel sole 27 can be formed by injecting a suitable material in the form forming said heel sole, or it may be manufactured together with the insert in the same material. Typically, the material is a hard TPU. However, if the insert 4 is made in for instance polymer reinforced carbon or glass fibres, there is a further process, where the heel sole is fastened to the lower surface of the insert. In this case, the heel sole will also typically be formed in a hard TPU and glued to the lower bottom surface.

The sole material—the second material may be:
Polyurethane based on ester single density
Shore hardness A measured on plate after 24 hours: 42+/−4
Density on sole after 24 hours: 0.5+/−0.03 per cm².

The first material used for the insert is characterised by being harder and also more rigid and stronger than the second material used for the outsole unit 29.

LIST OF REFERENCES

1 Heeled footwear
2 a sole assembly
3 heel part
4 insert
5
6
7 core body
8 upper surface
9 lower bottom surface
10 outer surface connecting upper and lower surfaces
11
12 outer contour layer
13 outsole
14 bores
15
16
17
18
19 a longitudinal axis of the core body
20 an opening upper surface
21 bolt or screw
22 a thread bore
23 upper core part
24 upper surface concave upwards
25 a middle core part
26 a lower core part
27 heel sole
28, 28' supporting legs, flanges and ribs
29 outer sole unit (outsole and outer contour layer)
30 shank
31 insole
32
33 upper
34 top part
35 rectangular opening
36 main plate
37 further plate
38 flange
39 rim
40 cavity

The invention claimed is:

1. A heeled footwear comprising a sole assembly and a heel part, said heel part comprising an insert formed of a first material comprising a polymer substance, the insert comprising a core body delimited by an upper surface and a lower bottom surface placed opposite the upper surface and an outer surface connecting the upper and lower surfaces, the outer surface being a radial side wall of the insert, at least a part of the outer surface being enclosed in an outer material formed of a second polymer material different from the first material, the outer surface comprising a retention means extending radially outwardly from the radial side wall of the insert and configured to increase the retention between the insert and the outer material; wherein the outer material forms an outer contour layer of the heel part and the sole assembly comprises an outsole formed of the second material, said second material not covering the lower bottom surface and said second material being softer than the first material, and that the outsole and the outer contour layer are configured to be formed in one piece providing an outer sole unit being one component, wherein the second material surrounds the outer surface of the insert.

2. The heeled footwear according to claim 1, wherein a Young's modulus of the first material is larger than a Young's modulus of the second material.

3. The heeled footwear according to claim 1, wherein Shore A value for the second material is in the range of 30-50 Shore A.

4. The heeled footwear according to claim 1, wherein the core body comprises a lower core part delimited by the lower bottom surface and an upper core part delimited by the upper surface and a middle core part connecting the upper and lower parts, said upper core part and middle core part being enclosed in the outer material forming the outer contour layer.

5. The heeled footwear according to claim 1, wherein the lower bottom surface is covered with a wear-resistant heel sole made in a third material different from the second material or said lower bottom surface being formed in a wear-resistant material being the first material.

6. The heeled footwear according to claim 1, wherein the first material comprises a polymer matrix reinforced with glass fibers.

7. The heeled footwear according to claim 1, wherein the first material comprises a polymer reinforced with 25-45% glass fiber.

8. The heeled footwear according to claim 1, wherein the first material comprises thermoplastic polyurethane (TPU), said material having a Young's modulus of at least 8 GPa.

9. The heeled footwear according to claim 1, wherein the second material comprises polyurethane polymer.

10. The heeled footwear according to claim 1, wherein in a direction parallel with a longitudinal axis of the footwear, the upper surface forms an angle in the interval of 90°-45° relative to a longitudinal axis of the core body.

11. The heeled footwear according to claim 1, wherein the upper surface comprises an opening that continues into a bore, said bore comprising a thread for receiving a threaded fastening means.

12. The heeled footwear according to claim 1, wherein the core body comprises an upper core part being formed as the upper half part of an hourglass and delimited by the upper surface.

13. The heeled footwear according to claim 1, wherein the sole assembly comprises the outsole, an insole and a shank.

14. The heeled footwear according to claim 1, wherein the core body comprises supporting legs, flanges or ribs, and the second material is arranged to surround the legs, flanges or ribs.

15. The heeled footwear according to claim 1, wherein the core body comprises at least one flange, said flange being provided with a retention component, and the second material is arranged to encase the flange and the retention component.

16. A method for producing heeled footwear according to claim 1, said footwear comprising a sole assembly and a heel part, said heel part comprising an insert formed in a first material comprising a polymer substance, the insert comprising a core body delimited by an upper surface and a lower bottom surface placed opposite the upper surface and an outer surface connecting the upper and lower surfaces, the outer surface being a radial side wall of the insert, at least a part of the outer surface being enclosed in an outer material formed in a second polymer material different from the first material, the outer surface comprising a retention means extending radially outwardly from the radial side wall and configured to increase the retention between the insert and the outer material; the method comprising the following steps: placing the insert in a mold, placing an upper, an insole and a shank in the mold in a predefined relation to the insert, closing the mold and injecting a second material into the closed mold, whereby the second material encases at least parts of the outer surface, said second material not covering the lower bottom surface, and whereby an outer contour layer of the heel part and an outsole are formed as one component being an outer sole unit.

17. The heeled footwear according to claim 1, wherein the retention means extends radially outwardly from a longitudinal axis of the insert.

* * * * *